Figure 1:
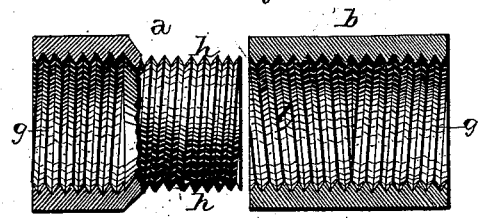
Figure 2:
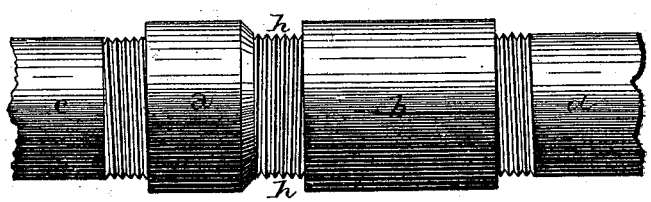
Figure 3:
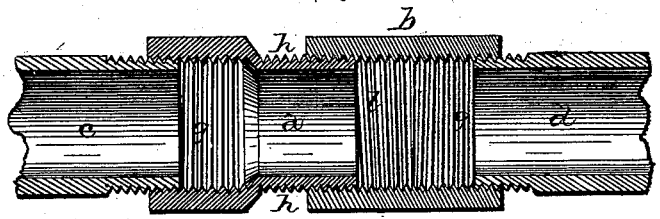

W. M. MARTIN.
TUBING FOR OIL-WELLS.

No. 176,796. Patented May 2, 1876.

WITNESSES
J. Wm Garner
Jno. H. Irwin

INVENTOR
W. M. Martin,
per
F. A. Lehmann, Atty

UNITED STATES PATENT OFFICE.

WILLIAM M. MARTIN, OF BALDWIN, PENNSYLVANIA.

IMPROVEMENT IN TUBING FOR OIL-WELLS.

Specification forming part of Letters Patent No. 176,796, dated May 2, 1876; application filed August 28, 1875.

*To all whom it may concern:*

Be it known that I, W. M. MARTIN, of Baldwin, in the county of Butler and State of Pennsylvania, have invented certain new and useful Improvements in Tubing for Oil-Wells; and I do hereby declare the following to be a full, clear, and exact description of the invention, such as will enable others skilled in the art to which it pertains to make and use it, reference being had to the accompanying drawings, which form part of this specification.

My invention relates to an improvement in casings for oil-wells; and it consists in a thimble or joint that is made in two parts, each of which parts has a right-hand female screw cut in its outer end, while the two parts are joined together by a left-hand screw, as will be more fully described hereinafter, whereby all of the tubing may be separated from the lower section without having to cut any part or portion.

The accompanying drawings represent my invention.

*a b* represent the two parts of the coupling; *c*, one of the sections of the tubing above the coupling, and *d* the last section of the tubing, and which is left in the well.

In the outer end of each part of the thimble there is a right-hand screw-thread, *g*, in the usual manner, so as to receive the ends of the pipes, while in the inner or upper end of the lower part of the thimble there is cut a left-hand female screw, *l*, to receive the left-hand male screw *h* on the lower or inner end of the upper part of the thimble.

After a well has run dry and it is desired to take out the casing, it is found to be impossible to do so, as the lower section is always made fast, so as to make it water-tight. It then becomes necessary to cut the casing above the lower section—an operation that requires special tools, takes a great deal of time, and is very expensive. By connecting the last section of pipe with the section above by means of a thimble made in two parts, as described, whenever it is desired to take out the casing, it is only necessary to unscrew the whole upper portion, leaving only the last section of pipe alone in the ground.

Having thus described my invention, I claim—

A thimble or coupling for casing of oil-wells that is made in two parts, *a b*, and provided with right and left hand screw-threads, substantially as described.

In testimony that I claim the foregoing I have hereunto set my hand this 23d day of August, 1875.

WILLIAM M. MARTIN.

Witnesses:
 M. S. RAY,
 WM. McKEE.